(12) United States Patent
Salazar Hernandez et al.

(10) Patent No.: US 12,157,855 B2
(45) Date of Patent: *Dec. 3, 2024

(54) HYDROCARBON RECOVERY WITH STEAM AND SOLVENT STAGES

(71) Applicant: ConocoPhillips Company, Houston, TX (US)

(72) Inventors: Arelys Y. Salazar Hernandez, Houston, TX (US); Tawfik N. Nasr, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,706

(22) Filed: Jun. 17, 2022

(65) Prior Publication Data

US 2022/0315828 A1    Oct. 6, 2022

Related U.S. Application Data

(63) Continuation of application No. 14/080,320, filed on Nov. 14, 2013, now Pat. No. 11,370,958.

(60) Provisional application No. 61/731,093, filed on Nov. 29, 2012.

(51) Int. Cl.
| | | |
|---|---|---|
| *E21B 43/26* | (2006.01) | |
| *C09K 8/58* | (2006.01) | |
| *C09K 8/592* | (2006.01) | |
| *E21B 43/08* | (2006.01) | |
| *E21B 43/24* | (2006.01) | |

(52) U.S. Cl.
CPC .......... *C09K 8/592* (2013.01); *E21B 43/2408* (2013.01)

(58) Field of Classification Search
None
See application file for complete search history.

(56) References Cited

U.S. PATENT DOCUMENTS

| | | | |
|---|---|---|---|
| 4,344,485 A | 8/1982 | Butler | |
| 6,230,814 B1 | 5/2001 | Nasr et al. | |
| 6,591,908 B2 | 7/2003 | Nasr | |
| 7,464,756 B2 | 12/2008 | Gates | |
| 2010/0130386 A1* | 5/2010 | Chakrabarty | C10G 1/04 510/366 |

(Continued)

FOREIGN PATENT DOCUMENTS

| | | |
|---|---|---|
| CA | 1228021 A | 10/1987 |
| CA | 2705680 * | 12/2011 |
| WO | 2012148581 A2 | 11/2012 |

OTHER PUBLICATIONS

Over Gupta et al. "Effect of Solvent Sequencing and Other Enhancements on Solvent Aided Process", Sep. 2007, vol. 49, No. 9, Journal of Canadian Petroleum Technology, p. 57-61 (Year: 2007).*

(Continued)

*Primary Examiner* — Charles R Nold
(74) *Attorney, Agent, or Firm* — Boulware & Valoir PLLC

(57) ABSTRACT

A steam-assisted gravity drainage method is described that includes a two stage solvent injection scheme, wherein steam plus solvent injection is followed by steam plus heavier-solvent injection. The two solvent injections improve recoveries of both the heavy oil and the injected solvent while limiting steam requirements, thus improving the economics of the method.

16 Claims, 2 Drawing Sheets

(56) References Cited

U.S. PATENT DOCUMENTS

2010/0276140 A1* 11/2010 Edmunds ............ E21B 43/2408
166/272.3

OTHER PUBLICATIONS

Govind, P. A.; Das, S.; Srinivasan, S.; Wheeler, T. J. (2008) "Expanding solvent SAGD in heavy oil reservoirs." Paper presented at SPE International Thermal Operations and Heavy Oil Symposium, Calgary, Alberta, CA. SPE-117571.

Li, W.; Mamora, D. D. (2010) "Experimental investigation of solvent co-injection in vapor and liquid phase to enhance SAGD performance." Paper presented at the SPE Annual Technical Conference and Exhibition, Florence, Italy. SPE-133277.

Li, W.; Mamora, D. D. (2010) "Drainage mechanism of steam with solvent coinjection under steam assisted gravity drainage (SAGD) process." Paper presented at the CPS/SPE International Oil & Gas Conference and Exhibition in Beijing, China. SPE-130802.

Masrt. N.; Beaulieu, G.; Golbeck, H.; Heck, G. (2003) Novel expanding solvent-SAGD process "ES-SAGD" J Can Pet Technology 42(1) 13-16.

Akinboyewa, J.; Das, S. K.; Wu, Y-S.; Kazemi, H. (2010) "Simulation of expanding solvent—steam assisted gravity drainage in a field case study of a bitumen oil reservoir." Paper presented at SPE Improved Oil Recovery Symposium, Tulsa, OK. SPE-129963.

* cited by examiner

HYDROCARBON RECOVERY WITH STEAM AND SOLVENT STAGES

CROSS-REFERENCE TO RELATED APPLICATIONS

This application is a continuation application of Ser. No. 14/080,320, filed Nov. 14, 2013 (now U.S. Pat. No. 11,370,958), which is a non-provisional application that claims priority to U.S. Provisional Application Ser. No. 61/731,093, filed Nov. 29, 2012, each entitled "HYDROCARBON RECOVERY WITH STEAM AND SOLVENT STAGES," each of which is incorporated herein in its entirety for all purposes.

FEDERALLY SPONSORED RESEARCH STATEMENT

Not applicable.

FIELD OF THE INVENTION

Embodiments relate to methods of enhancing expanding solvent steam assisted gravity drainage (ES-SAGD) oil production and reducing solvent retention in the reservoir and hence improving economics of the process by dictating the timing and/or the solvent profile used in the process.

BACKGROUND OF THE INVENTION

A common way of categorizing petroleum deposits is by density. Light oil—also known as "conventional oil"—has an API gravity of at least 22° and a viscosity less than 100 centipoise (cP). Heavy oil, by contrast, is an asphaltic, dense (low API gravity), and viscous hydrocarbon that is chemically characterized by its content of asphaltenes. Although definitions vary, the upper limit for heavy oils is usually set at 22° API gravity and a viscosity of less than 100 cP.

The heavier crudes present a difficult economic proposition for the development of such petroleum resources. The reserves of heavy oil in the world are more than twice those of conventional light crude oil. Indeed, it has been reported that there may be as much as six trillion barrels of heavy oil and bitumen throughout the world, much of it located in Canada and Venezuela. Typical characteristics of the various oils are shown in Table 1, below.

TABLE 1

Range of Properties of Various Types of Petroleum

|  | Extra-light Crude Oil | Light Crude Oil | Heavy Crude Oil | Extra-Heavy Crude Oil |
|---|---|---|---|---|
| API gravity | >50 | 22-32 | 10-22 | <10 |
| Hydrocarbons (wt %) | | | | |
| Asphaltenes | 0-<2 | <0.1-12 | 11-25 | 15-40 |
| Resins | 0.05-3 | 3-22 | 14-39 | |
| Oils | — | 67-97 | 24-64 | |
| Impurities (Wt %) | | | | |
| Total sulfur | 0.02-0.2 | 0.05-4.0 | 0.1-5.0 | 0.8-6.0 |
| Total nitrogen | 0.0-0.01 | 0.02-0.5 | 0.2-0.8 | 0.1-1.3 |
| Ni + V (wpmm) | <10 | 10-200 | 50-500 | 200-600 |

Although plentiful, the recovery costs are very high due to the extreme viscosity of the oil, and the recovery is often limited to only about 5-30% of the oil in place. Nonetheless, since the light oil resources are being rapidly diminished, developers are continually searching for new ways of producing heavy oil as cost effectively as possible to meet the ever-increasing demand.

Usually, heavy oil is produced by thinning the oil enough to make it pumpable, and thinning is typically achieved by applying heat, often in the form of steam, and/or adding solvents to partially dilute the oil. Table 2 lists a variety of techniques being used or in development for use in recovering heavy oils. While the technology utilized for the recovery of heavy oil has steadily increased recovery rates, there is still considerable room for improvement in this continually developing area of enhanced oil recovery.

TABLE 2

Enhanced Oil Recovery (EOR) Techniques

| | |
|---|---|
| CSS | Cyclic Steam Stimulation or "huff and puff." Steam is injected into a well at a temperature of 300-340° C. for a period of weeks to months. The well is allowed to sit for days to weeks to allow heat to soak into the formation, and, later, the hot oil is pumped out of the well for weeks or months. Once the production rate falls off, the well is put through another cycle of steam injection, soak and production. This process is repeated until the cost of injecting steam becomes higher than the money made from producing oil. Recovery factors are around 20 to 25%, but the cost to inject steam is high. |
| SAGD | Steam Assisted Gravity Drainage uses at least two horizontal wells-- one at the bottom of the formation and another about 5 meters above it. Steam is injected into the upper well, the heat melts the heavy oil, which allows it to drain by gravity into the lower well, where it is pumped to the surface. SAGD is cheaper than CSS, allows very high oil production rates, and recovers up to 60% of the oil in place. |
| ES-SAGD | In the Expanding Solvent-SAGD process a small concentration of condensable solvent is co-injected along with the steam phase in a conventional SAGD pattern. |
| VAPEX | Vapor Extraction Process is similar to SAGD, but instead of steam, hydrocarbon solvents are injected into an upper well to dilute heavy oil and enable the diluted heavy oil to flow into a lower well. |
| ISC | In situ Combustion involves a burning of a small amount of the oil in suit, the heat thereby mobilizing the heavy oil. |
| THAI | Toe to Heel Air Injection is an ISC method that combines a vertical air injection well with a horizontal production well. The process ignites |

TABLE 2-continued

Enhanced Oil Recovery (EOR) Techniques

|         |   |
|---------|---|
|         | oil in the reservoir and creates a vertical wall of fire moving from the "toe" of the horizontal well toward the "heel", which burns the heavier oil components and upgrades some of the heavy bitumen into lighter oil right in the formation. Fireflood projects are not extensively used due to the difficulty in controlling the flame front and a propensity to set the producing wells on fire. However, the method uses less freshwater, produces 50% less greenhouse gases, and has a smaller footprint than other production techniques. |
| COGD    | Combustion Overhead Gravity Drainage is another ISC method that employs a number of vertical air injection wells above a horizontal production well located at the base of the bitumen pay zone. An initial Steam Cycle similar to CSS is used to prepare the bitumen for ignition and mobility. Following that cycle, air is injected into the vertical wells, igniting the upper bitumen and mobilizing (through heating) the lower bitumen to flow into the production well. It is expected that COGD will result in water savings of 80% compared to SAGD. |
| EM      | A variety of electromagnetic methods of heating oil in situ are also being developed. |
| GAS INJECTION | A variety of gas injection methods are also used or being developed, including the use of cryogenic gases. |
| COMBO   | Any of the above methods can be used in combination. |

The Steam Assisted Gravity Drainage (SAGD) process, invented by Butler in the early 80's (e.g., U.S. Pat. No. 4,344,485) has been the most popular thermal recovery process used in recent years to produce heavy oil and bitumen. In the SAGD process, at least two horizontal wells are drilled, one over the other, and steam injected into the upper well. The heat from the steam mobilizes the oil, which then gravity drains into the lower well. The lower well thus collects both the mobilized oil and a large amount of condensate. The advantage of the SAGD process is its high oil production rate, recovering as much as 60-70% of the oil in place. However, the high production rate of the SAGD process is also associated with intensive energy consumption and $CO_2$ emissions from burning natural gas to generate steam, as well as costly post-production water purification treatment and separation of the water from the production fluid. Further, the steam to oil ratio is quite high (~3), and high water usage is a deterrent in many locations.

VAPEX is the non-thermal counterpart of SAGD and works on similar principles. As with SAGD, at least two parallel horizontal wells are drilled with an injector positioned directly above an accompanying producer. Solvent is injected through the injection well just below the solvent's vapor pressure; for solvent mixtures the injection pressure is just below the dew point. The vapor rises and contacts the oil whereon diffusion into the oil occurs. When enough solvent diffuses into the oil, the oil is mobilized under the force of gravity. As the oil is transported by gravity drainage into the producing well, a fresh face of heavy oil is exposed and the process is continued.

The VAPEX process operates as a closed system and can overcome unacceptable heat losses associated with thermal methods due to thin pay zones, gas caps, aquifers, high water saturation, and low porosity formations. In many reservoirs, the solvent vapor could effectively remain within the pore space, as opposed to thermal methods where much of the heat can be wasted. The VAPEX process also shows great promise in regards to in situ upgrading of oil (due to asphaltene precipitation), which could cut transportation costs.

Solvent processes reduce water usage and also reduce the energy costs needed to heat water to make steam, but the costs of solvent can be quite high, and recoveries can be more limited than with SAGD. Furthermore, the process can be very slow, since it is limited by a diffusion mechanism.

Therefore, several new developments in enhanced oil recovery techniques combine steam and solvent, in an attempt to reduce solvent usage, whilst retaining some of its benefits. Combination or hybrid methods for example, Liquid Addition to Steam for Enhancing Recovery (LASER), and many more variations exist.

The Expanding Solvent-SAGD process (ES-SAGD) is yet another hybrid steam-solvent process that was developed and patented by Nasr (e.g., U.S. Pat. Nos. 6,230,814; 6,591,908). It has been shown that combining solvent dilution and heat reduces oil viscosity much more effectively than using heat alone.

In the ES-SAGD technique, a small concentration of condensable solvent is co-injected along with the steam phase in a conventional SAGD pattern. There are some screening criteria to select the suitable solvent: for example, the boiling point temperature should closely match that of the steam phase at the operating chamber pressure. The higher the solvent carbon number is, the higher the vaporization temperature will be. The steam additive ideally should be kept in the gaseous state when traveling from the injection well until it reaches the bitumen interface. This allows operators to select the appropriate steam additive among the hydrocarbon solvents.

The ES-SAGD process has been successfully field-tested and the results were promising in enhancing the steam to oil ratio and also improving recovery rates, thus reducing the energy intensity and water requirements of the process compared to a conventional SAGD process. These results were generally confirmed by Govind (2008), who concluded that the addition of solvent accelerates production significantly and reduces the steam to oil ratio to about 2 and thus, improves the energy efficiency of the process. Govind also suggested that at higher operating pressure, butane was the optimum solvent because of a high vapor pressure value.

One feature of the ES-SAGD process is that any recovered solvent can be re-injected into the reservoir. However, if too much solvent is injected and/or too little is recovered, the process can be less economic because the solvent can be more expensive than the produced heavy oil. The economics of a steam-solvent injection process thus depends on the enhancement of oil recovery as well as on solvent recovery. The lower the solvent retention in the reservoir, the better the economics of the process.

Thus, what is needed in the art are improved methods of producing heavy oils, preferably a method that reduces solvent/steam needs, rather than increasing them.

SUMMARY OF THE INVENTION

The Expanding Solvent Steam-Assisted Gravity Drainage (ES-SAGD) process is an enhancement of the SAGD process. In the ES-SAGD process, a small amount of solvent, or solvent mixture, is added to the injected steam. The steam and solvent mixture form a vapor chamber and the mixture condenses at the edge of the chamber. The steam delivers its latent heat to the oil and the liquid solvent simultaneously dissolves into the oil, further diluting the oil, and in conjunction with the heat imparted by the steam, reduces the oil viscosity sufficient for oil gravity drainage to a lower production well.

Embodiments of the invention relate to selection of solvents and the timing of solvent addition to control both oil and solvent recovery rates while limiting steam requirements. In general, the injection of a lighter solvent plus steam, followed by injection of a heavier solvent plus steam improves oil recovery, as well as reduces solvent and steam usage.

While not wishing to be bound by theory or limit the claims thereby, it is believed that the lighter solvents can penetrate deeper, and thus recover a certain percentage of the heavy oils that are otherwise not recoverable. However, the lighter solvents used alone have a detrimental impact on the oil recovery and solvent retention overall because the lighter solvents (C4 or less) remain mostly in gas phase with only minimal condensation. The lighter components can thus maintain a large volume in the chamber, reducing the steam volume to be injected. But at the same time, they can accumulate at the edges of the steam chamber, forming a thick gas blanket and reducing the transfer of heat and the contact of the oil with the steam, minimizing the oil to be recovered.

On the other hand, most of the heavier solvents, e.g., C5-8, evaporate and condense close to or slightly before the steam condensation temperature and pressure conditions. Thus, the solvent condensate at the chamber edges can dilute and reduce the oil viscosity and maximize the oil production. At the same time, it can also sweep out the lighter solvents, thus improving their recovery.

Our study shows that injecting lighter solvent at the beginning of solvent injection, decreasing its time of injection, and following with a heavier solvent, sweeps out the lighter solvent, improving the oil recovery and reducing the solvent retention in the reservoir. Injecting the lighter solvent components for short time followed by the heavier solvent components, (e.g. 1 year at 66% C4− followed by 3.5 years 95% C5+) can develop the steam chamber in less time and with less steam volume injection because of the lighter solvent, plus we improve both solvent recovery and the oil production as a result of the heavier solvent injection, compared with the lighter solvent injection alone.

In various embodiments, the invention can comprise a method of producing a heavy oil, comprising providing an injection well and a production well in fluid communication with said injection well; injecting steam and a first solvent into said injection well for a first period of time, said first solvent having Cn carbons, wherein n is 1-4; injecting steam and a second solvent into said injection well for a second period of time, said second solvent having Cn+m, wherein m=1-26; and collecting a mobilized heavy oil from said production well.

In some embodiments, the lighter solvents are injected before the heavier solvents, which sequence may be repeated.

In other preferred embodiments, the second period of time is longer than the first period, but this is not essential, particularly where the injection steps are repeated.

Also, preferred, the methods include recovering and reusing said first and second solvent.

Further, the methods can be combined with any other enhanced oil recovery method known or to be developed, and in one embodiment is used with any steam-based process, such as CSS, SAGD, ES-SAGD, steam flood, or derivative of same.

Another embodiment is an improved method of ES-SAGD comprising injecting steam and solvent into an injection well and recovering produced hydrocarbons from a production well, the improvement comprising injecting steam and a first solvent for a period of time, followed by injecting steam and a second solvent that is of higher molecular weight than said first solvent for a second period of time.

Another embodiment is an improved method of ES-SAGD comprising injecting steam and solvent into an injection well and recovering produced hydrocarbons from a production well, the improvement comprising injecting steam and a first C1-C4 or C3-C4 solvent for a period of time, followed by injecting steam and a second C5-C8 or C5-C12 solvent for a second period of time.

Another embodiment is an improved method of expanding solvent steam assisted gravity drainage (ES-SAGD) comprising injecting steam and solvent into an injection well and recovering produced hydrocarbons from a production well, the improvement comprising injecting steam and a first C1-C4 or C3-C4 solvent for a period of time, followed by injecting steam and a second C5-C8 or C5-C12 solvent for a second period of time of greater than said first period of time.

Another embodiment is a method of producing a heavy oil by ES-SAGD, said method comprising providing in a heavy oil formation a horizontal injection well and a horizontal production well beneath said injection well, wherein said injection well and said production well are in fluid communication with each other; injecting steam and a first solvent into said injection well for a first period of time, said first solvent having Cx carbons, wherein x is 1-4; subsequently injecting steam and a second solvent into said injection well for a second period of time, said second solvent having Cy carbons, wherein y=5-12; collecting a produced heavy oil from said production well, wherein an amount of heavy oil produced is increased using two step injections together, over using either injection alone for a same total period of time.

Any of the embodiments can be combined with one of the following features (wherein any Cn can be Cx and any Cn+m can be Cy):

Cn is C1-C4, and Cn+m is at least 90% C5-C12.
Cn is 80-90% C3-C4, and Cn+m is 80-90% C5-C9.
Cn is 80-90% C3-C4, and Cn+m is 80-90% C5-C6.
Cn is at least 66% C4, and Cn+m is at least 80% or 95% C5.
Cn is >50% C3-C4, and Cn+m is >50% C5-C9.
Cn includes $CO_2$, methane, ethane, propane, butane, flue gases or combinations thereof.

Cn+m includes pentane, hexane, heptane, octane or combinations thereof.

Said first and second solvents comprise 10-30% liquid volume of the injected fluid.

Said first and second solvents comprise 25% liquid volume of the injected fluid.

Cn is C4 and the first period is about 1 year, and Cn+m is C5 and the second period is about 3.5 years. By "about" a year or other time period, we mean that period +/−50%.

Cn is about 66% C4 and the first period is about 1 year, and Cn+m is about 95% C5 and the second period is about 3.5 years.

Said first and second solvents comprise 10-30% liquid volume of the injected fluid.

Said first and second solvents comprise 25% liquid volume of the injected fluid.

The herein identified operating strategy for the ES-SAGD process can result in significant performance improvements over that from SAGD and better exploitation of heavy oil and oil sands reservoirs.

As used herein, "bitumen" and "extra heavy oil" are used interchangeably and refer to crudes having less than 10° API.

As used herein, "heavy oil" refers to crudes having less than 22° API.

As used herein a "production stream" or "production fluid" means a crude hydrocarbon that has just been pumped from a reservoir and typically contains mainly heavy oil and/or bitumen plus water and/or solvent.

By "fluid" herein, we mean liquid, gas, or a combination thereof.

By "steam", we mean water vapor or a combination of liquid water and water vapor. It will be understood by those skilled in the art that steam usually contains additional trace elements, gases other than water vapor, and/or other impurities. The temperature of steam can be in the range of from about 150° C. to about 350° C. However, as will be appreciated by those skilled in the art, the temperature of the steam is dependent on the operating pressure, which may range from about 100 psi to about 2,000 psi (about 690 kPa to about 13.8 MPa).

By "solvent", we mean a fluid that can dilute heavy oil and/or bitumen. Examples of suitable candidates for non-aqueous fluids that may satisfy the selection criteria discussed more fully below include, without limitation, C1 to C30 hydrocarbons, preferably C1-C12, or C1-C8, and combinations thereof. Examples of suitable C1 to C30 solvents include, without limitation, alkanes such as methane, ethane, propane, butane, pentane, hexane, heptane, octane, nonane, decane, undecane, dodecane, etc., as well as various available hydrocarbon fractions, such as condensate, gasoline, light naphtha, diesel, and combinations thereof, as well as light gases, such as $CO_2$, $H_2S$, flue gases and the like.

In choosing suitable heavy solvents, the solvent vaporization temperature should be close to the steam temperature and pressure under reservoir operating conditions. This means that the solvent should condense at approximately the same conditions that steam does. Generally speaking, C5-C12 or C5-C8 are preferred heavy solvents, and especially C5-C6 and/or C5-C7, although this can vary with reservoir conditions.

In choosing suitable light solvents, the solvent vaporization temperature should be below the steam temperature and pressure under reservoir operating conditions. This means that the solvent should condense after the steam does. Generally speaking, C1-C4 are preferred light solvents, and especially C3-C4, although this can also vary with reservoir conditions.

It is recognized by those of skill in the art that most solvents are not inexpensively available in 100% pure form and that pure solvents are not needed for the method anyway. For example, solvents may comprise constituents within a similar or lower boiling point range where it is stated herein that a solvent is a C4 solvent. In some embodiments, the C1-C4 solvents are thus at least 66% as specified, e.g., 66% C1-C4, but 70, 75, 80, 85, and 90% solvents may also be used instead.

Preferably, the amount of solvent in the heated fluid composition is in the range of from about 1-50% liquid volume of the injected fluid composition, but it is appreciated by those of skill in the art that more solvent is needed for more viscous hydrocarbons and colder reservoirs, and thus the amounts can vary depending on the characteristics of the reservoir. More preferably, the amount of solvent in the heated fluid composition is in the range of from about 10-40%, or about 20-30% or about 25% liquid volume of the fluid composition.

By "% liquid volume", we mean the liquid volume of solvent divided by the sum of the liquid volume of solvent and the liquid volume of steam in the fluid composition. In other words, a cold water equivalent steam volume is used since steam volume can be quite variable.

It will be understood that where a combination or blend of solvents is used, the evaporation temperature of the mixture may differ from the evaporation temperatures of the individual non aqueous solvents. Accordingly, in the case where a combination of non-aqueous fluids is used, the evaporation temperature of the solvent may be a bulk evaporation temperature.

In the case of either the single or multiple wellbore embodiments of the invention, if fluid communication is not already established, it must be established, at some point in time, between the producing wellbore and a region of the subterranean formation containing the hydrocarbon fluids affected by the injected fluid, such that heavy oils can be collected from the producing wells.

By "fluid communication" we mean that the mobility of either an injection fluid or hydrocarbon fluids in the subterranean formation, having some effective permeability, is sufficiently high so that such fluids can be produced at the producing wellbore under some predetermined operating pressure. Means for establishing fluid communication between injection and production wells includes any known in the art, including steam pre-heating, fracturing the reservoir, RF or electrical heating, ISC, and the like.

By "providing" wellbores herein, we do not imply contemporaneous drilling. Therefore, either new wells can be drilled, or existing wells can be used as is, or retrofitted as needed for the method.

In one embodiment of the invention, the heated fluid composition may be injected into an injection well by first mixing the steam and solvent, preferably in the gas phase, prior to injection. In a second embodiment of the invention, separate lines for steam and solvent can be used to independently, but concurrently, introduce steam and additive into the injection well, where the steam and solvent will mix. A separate solvent injection is particularly suitable for retrofitting existing processes. Also, it may be easier to monitor the solvent flow rate where separate steam and solvent lines are used to inject the heated fluid composition.

By "increased hydrocarbon mobility", we mean that the hydrocarbon has decreased viscosity and/or reduced interfacial tension, as compared with a hydrocarbon produced using only steam and a single solvent under substantially similar injection and formation conditions.

In one embodiment of the invention, steam and additive may be co-injected. In another embodiment of the invention, steam injection may be alternated with steam/additive co-injection.

The two solvent method is most preferably combined with ES-SAGD, however, it is not limited to such methods and the two solvent method can be used in any known or invented solvent/steam hybrid enhanced oil production methods. Thus, the method can be used with toe to heal steam production methods, steam assisted gas push methods, CSS, and the like. Furthermore, the two solvent methods can be used before or after any of the existing EOR methods. Thus, for example, an injection/production well pair can be initiated with CSS, and the two solvent methods can follow thereafter.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", and "include" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| API | American Petroleum Institute |
| API gravity | To derive the API gravity from the density, the density is first measured using either the hydrometer, detailed in ASTM D1298 or with the oscillating U-tube method detailed in ASTM D4052. Direct measurement is detailed in ASTM D287. |
| bbl | barrel |
| COGP | Combustion Overload Gravity Drainage |
| cP | Centipoise |
| CSS | Cyclic Steam Stimulation |
| cSt | Centistokes. Kinematic viscosity is expressed in centistokes |
| EM | Electromagnetic Method |
| EOR | Enhanced oil recovery |
| ES-SAGD | Expanding solvent SAGD |
| ISC | In situ combustion |
| LASER | Liquid Addition to Steam for Enhanced Recovery |
| SAGD | Steam Assisted Gravity Drainage |
| SOR | Steam oil ratio |
| THAI | Toe to Heel Air Injection |
| VAPEX | Vapor Extraction |

BRIEF DESCRIPTION OF THE DRAWINGS

In FIG. 1 and FIG. 2 and as used herein, "C4−" signifies a mixture of C1-C4, and C5+ signifies a mixture of C5 and higher carbon number solvents.

FIG. 2. Solvent Retention Characteristics.

DETAILED DESCRIPTION OF THE INVENTION

Figure 1:
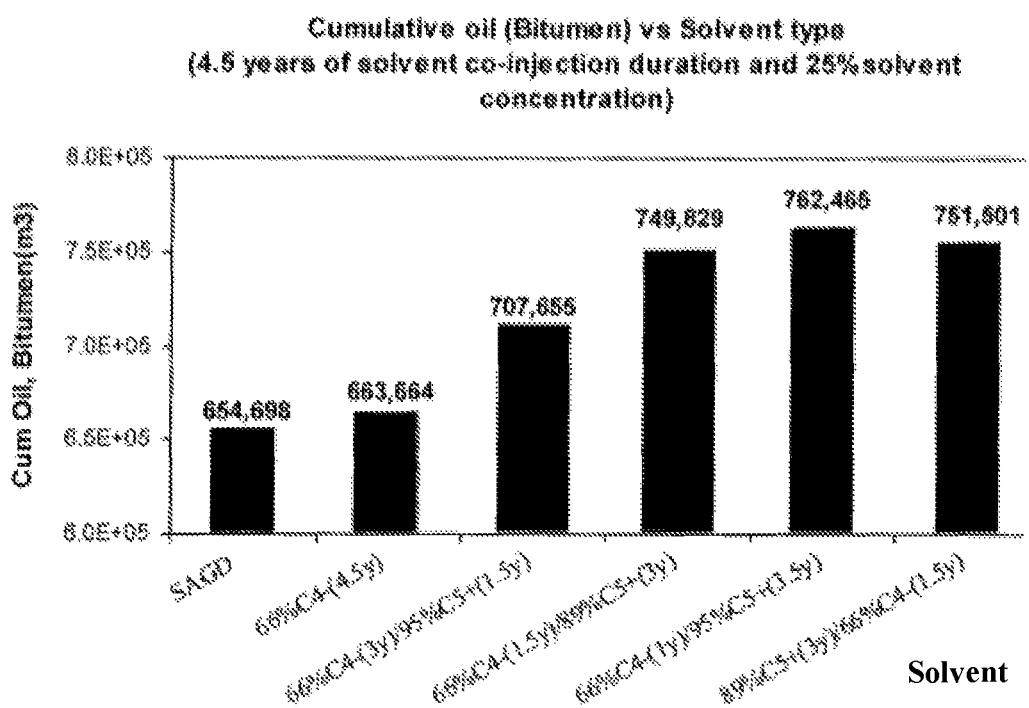
FIG. 1. Cumulative Oil Production Comparisons.

Prior art ES-SAGD technology involved the co-injection of steam and solvent for the gravity assisted production of heavy oils. The art generally teaches that heavier solvents give earlier recovery and greater recovery efficiency in terms of less solvent loss, but lighter solvents give improvement of oil production over SAGD, but at higher solvent loss.

Govind concluded that butane was the optimum solvent for the Cold Lake type reservoir with no initial solution gas, and that the optimum butane concentration was around 10% by weight; higher amounts leading to only incremental oil recovery. Nasr, in contrast, concluded that hexanes or diluents that contain mostly higher carbon numbers than 6 were the most preferred hydrocarbon additives. Others suggested that a mixture of solvents co-injected at the same time would be best. Work still needs to be done to provide a cost effective injection strategy.

In this work, we have surprisingly found that a two stage approach, e.g., butane followed by pentane, results in improved heavy oil mobility and better sweep of the reservoir. We theorize that a deep penetration is achieved with the lighter solvent, but that following with a heavier solvent more effectively allows heat transfer and solvent recovery by sweeping out and replacing the lighter solvent. Furthermore, we believe that repeated cycles of light followed by heavy solvents sweeps may allow even better recoveries.

A 3D heterogeneous field scale numerical model, based on Athabasca reservoir and fluid properties, was used to examine strategies for reducing solvent retention in the reservoir. The commercial thermal reservoir simulator "STARS," developed by Computer Modeling Group (CMG), was used in the numerical simulations described herein.

The simulated reservoir was 132 m wide and 44 m thick. Two horizontal wells, 950 meters long and separated by 5 meters were used in the investigation. A pre-heat period was used by circulating steam in both wells for a period of time, similar to field pre-heat. Following the pre-heat, steam plus solvent (ES-SAGD) was injected into the top well at a pressure of 3500 kPa for 4.5 years. The solvent used was a mixture of different hydrocarbons at a fixed total solvent concentration of 25%, 75% steam (% liquid volumes used).

Different compositions of solvent were evaluated during a simulated solvent injection period of 4.5 years. These compositions included:

Injecting 66% C4− during the entire 4.5 year injection period.

Injecting 66% C4− for 3 years followed by 95% C5+ for 1.5 years.

Injecting 66% C4− for 1.5 years followed by 89% C5+ injected for 3 years.

Injecting 66% C4− for 1 year followed by 95% C5+ injected for 3.5 years.

Injecting 89% C5+ for 3 years followed by 66% C4− injected for 1.5 years.

It was surprisingly found that ES-SAGD performance improved when a mixture of solvents containing 66% C4−

(remainder C5+) was injected for 1 year followed by injection of solvent containing 95% C5+ (remainder C4−) for 3.5 years.

FIG. 1 shows that decreasing the initial injection duration for a solvent containing 66% C4− from 4.5 years to 1 year, followed by a 3.5 year sweep with 95% C5+, resulted in a dramatic 15% improvement in oil production over the use of C4− alone (762,465 m$^3$ versus 663,664 m$^3$).

In contrast, when 66% C4− was injected initially for 3 years followed by a 1.5 year 95% C5+ sweep, e.g., longer light solvent sweep, the oil production decreased from 762,465 m$^3$ to 707,655 m$^3$, although there was still an improvement over the use of C4− alone.

Interestingly, the reverse—C5+ followed by C4−—is also less effective than a short C4− sweep followed by a longer C5+ sweep.

Figure 2:
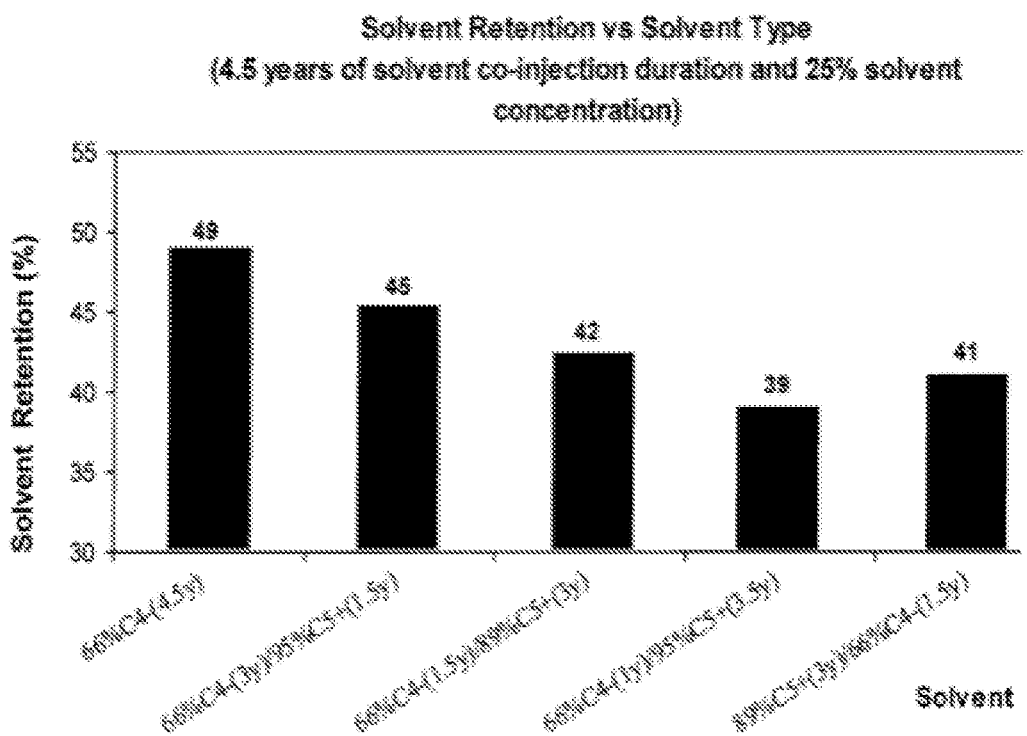

In addition, the solvent retention in the reservoir was reduced from 49% to 39% in FIG. 2 in the best case scenario, e.g., short light solvent sweep followed by longer heavy solvent sweep, although improvement was seen in all cases.

The above simulations show the benefit of a two solvent steam injection approach wherein a lighter solvent is followed by a heavier solvent to improve recovery rates and minimize solvent losses. This work may next be validated in a physical model or other bench top experiment, before being implemented as test in situ.

The following references are incorporated by reference in their entirety for all purposes.

SPE129963: Akinboyawa, et al., Simulation of expanding solvent-steam assisted gravity drainage in a field case study of a Bitumen Oil Reservoir (2010).
Nasr, et al., Novel expanding solvent-SAGD process "ES-SAGD," J. Can. Petrol. Technol. 42(1): 13-16 (2003).
U.S. Pat. Nos. 6,230,814; 6,591,908; 7,464,756
SPE117571: Govind, P., et al., Expanding solvent SAGD in heavy oil reservoirs (2008).
SPE133277: Li et al., Light- and heavy-solvent impacts on solvent-aided-SAGD process: A low-pressure experimental study (2011).
SPE130802-PA: Li et al., Solvent-type and -ratio impacts on solvent-aided SAGD process (2011).

The invention claimed is:

1. A steam and solvent method of producing heavy oil, said method consisting essentially of injecting steam and hydrocarbon solvent into an injection well and recovering produced hydrocarbons and water and hydrocarbon solvent from a production well:
   i) wherein the steam is initially injected with a first hydrocarbon solvent (first solvent) for a first period of time, followed by injecting the steam with a second hydrocarbon solvent (second solvent) instead of the first solvent that is of higher molecular weight than said first solvent for a second period of time that is longer than said first period of time;
   ii) wherein said first solvent and said second solvent comprise 10-30% liquid volume of injected fluid; and
   iii) wherein said method improves recoveries of said first solvent and said second solvent as compared to a steam and first solvent co-injection alone or as compared to steam and second solvent co-injection followed by steam and first solvent co-injection.

2. The method of claim 1, wherein the first solvent comprises $CO_2$, methane, ethane, propane or combinations thereof.

3. The method of claim 1, wherein the second solvent is C5+.

4. The method of claim 1, wherein the first solvent is C4 or less than C4 (C4−) and the second solvent is C5+.

5. The method of claim 1, wherein the first solvent is injected for about 0.5-1.5 years, and the second solvent is injected for greater than 3 years.

6. The method of claim 1, wherein said first solvent and said second solvent comprise 25% liquid volume of the injected liquid volume.

7. A method of producing heavy oil comprising:
   a. providing an injection well and a production well in fluid communication with said injection well;
   b. initially injecting steam and a first solvent into said injection well for a first period of time, said first solvent consisting essentially of C4 or less than C4;
   c. subsequently injecting steam and a second solvent instead of the first solvent into said injection well for a second period of time after the first period of time, said second solvent being C5 or more carbons; and
   d. collecting a mobilized heavy oil and said first solvent and said second solvent and water from said production well;
   e. wherein said method improves recoveries of said first solvent and said second solvent as compared to a steam and first solvent co-injection alone or as compared to a steam and second solvent co-injection followed by a steam and first solvent co-injection.

8. The method of claim 7, wherein said second period of time is longer than said first period of time.

9. The method of claim 7, wherein the second solvent is at least 80% C5.

10. The method of claim 7, wherein the first solvent includes methane, ethane, or propane, or combinations thereof.

11. The method of claim 7, wherein the second solvent includes pentane or hexane or combinations thereof.

12. The method of claim 7, wherein said first solvent and said second solvent comprise 10-30% liquid volume of the injected steam.

13. The method of claim 7, wherein said first solvent and said second solvent comprise 25% liquid volume of the injected steam.

14. The method of claim 7, wherein the first period is about 1 year, and the second period is about 3.5 years.

15. The method of claim 7, wherein the injection and production wells have parallel horizontal lengths that are in fluid communication.

16. A method of producing heavy oil after start-up, said method consisting essentially of:
   a. injecting steam and a first C4 or less than C4 hydrocarbon solvent (first solvent) for a first period of time;
   b. followed by injecting steam with a second ≥C5 hydrocarbon solvent (second solvent) instead of the first solvent for a second longer period of time;
   c. wherein said first and second solvents comprise 10-30% liquid volume of injected fluid;
   d. producing oil and water and said first and second solvents; and
   e. wherein said method improves recoveries of said first and second solvents as compared to a steam and first solvent co-injection alone or as compared to steam and second solvent co-injection followed by steam and first solvent co-injection.

* * * * *